United States Patent

Martin

[11] 4,331,797
[45] May 25, 1982

[54] ESTER CONTAINING SILYLATED POLYETHERS

[75] Inventor: Eugene R. Martin, Onsted, Mich.

[73] Assignee: SWS Silicones Corporation, Adrian, Mich.

[21] Appl. No.: 170,297

[22] Filed: Jul. 18, 1980

Related U.S. Application Data

[63] Continuation-in-part of Ser. No. 74,188, Sep. 10, 1979.

[51] Int. Cl.$^3$ ............................................. C08G 77/04
[52] U.S. Cl. ...................................... 528/26; 528/33;
427/387; 427/389; 427/394; 428/447;
428/475.2; 428/476.3; 428/480; 556/438;
556/440
[58] Field of Search .................... 528/26, 33; 427/387,
427/389, 394; 428/447, 475.2, 476.3, 480;
556/438, 440

[56] References Cited

U.S. PATENT DOCUMENTS 3,861,915  1/1975  Cawley .................................. 528/26
4,260,725  4/1981  Keogh et al. .......................... 528/26

Primary Examiner—Melvyn I. Marquis

[57] ABSTRACT

Silylated polyethers having the general formula

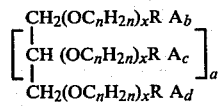

wherein at least one R is selected from the group consisting of

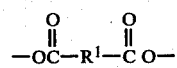

in which R is linked to the polyether through an ester radical, the remaining R groups are selected from hydrocarbonoxy radicals having up to 18 carbon atoms, hydroxyl radicals or a radical of the formula

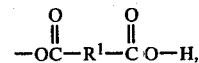

$R^1$ is a divalent hydrocarbon radical selected from the group consisting of $-(CH_2)_y-$, $-CH=CH-$, or a cyclic hydrocarbon radical selected from the group consisting of $C_6H_4$, $C_6H_8$, $C_6H_{10}$ and $C_{10}H_6$; A is a silicon containing radical selected from the group having the formulas

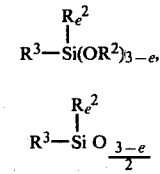

wherein $R^2$ which may be the same or different is a monovalent hydrocarbon radical having from 1 to 18 carbon atoms, $R^3$ is a divalent hydrocarbon radical having from 1 to 18 carbon atoms, a is a number of from 0 to 4, b, c and d are each numbers of from 0 to 1, the sum of b, c and d must be 1 when A is a monovalent radical and when b, c or d are 0, then R must be hydroxyl or a hydrocarbonoxy radical or a radical of the formula

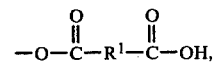

e is a number of from 0 to 2, n is 2, 3 or 4, x is a number of at least 1 and up to 600, preferably from 10 to 250 and y is a number of from 0 to 8. These silylated polyethers may be used to treat textile materials to impart hydrophilic finishes thereon.

18 Claims, No Drawings

ESTER CONTAINING SILYLATED POLYETHERS

This application is a continuation-in-part of copending application Ser. No. 074,188, filed on Sept. 10, 1979.

The present invention relates to silylated polyethers, and more particularly to a process for preparing silylated polyethers. Also, this invention relates to textile materials coated with silylated polyethers and to a process for coating the same.

BACKGROUND OF INVENTION

Heretofore textile materials have been treated with compositions containing a hydroxyl terminated organopolysiloxane, a crosslinking agent and a catalyst to impart a soft, silky, durable hand thereto. (See. U.S. Pat. Nos. 3,876,459 to Burrill and 3,770,489 to Richardson). Although treatment with these organopolysiloxanes has been very effective for the intended purpose, it has also imparted certain undesirable properties to the treated materials. For example, textile materials treated with organopolysiloxanes tend to soil more readily. Moreover, organopolysiloxanes have a tendency to impart hydrophobic properties to textile materials treated therewith, which in turn decreases the comfort of the material. Furthermore, organopolysiloxanes are generally applied to textile materials in the form of emulsions and these emulsions have a tendency to separate during application, thereby resulting in a non-uniform coating. When these coated textile materials are subjected to further treatment, such as dyeing or printing, the uneven distribution of organopolysiloxanes on the surface of the textile materials interferes with the print and dye quality of the material. Another disadvantage of organopolysiloxanes is that they generally require more than one component, and once the components have been mixed, the resultant composition is of limited stability.

Silicon containing materials which have been used to impart soil-repellent and soil-release properties to textile materials are described in U.S. Pat. Nos. 3,716,517 and 3,716,518 to Pittman et al. These silicon containing materials are prepared by copolymerizing at least one monomer capable of imparting oleophobic properties with at least one monomer capable of imparting hydrophilic properties. The oleophobic monomer is a silane which contains a terminal perfluoroalkyl group of from 3 to 18 perfluorinated carbon atoms. The hydrophilic monomer is a silane which contains two or more alkylene oxide groups in which the alkylene groups contain from 2 to 6 carbon atoms. These hydrophilic monomers are prepared by converting a monoetherified polyalkyleneoxy glycol to the corresponding allyl ether by reacting it with allyl bromide in the presence of a base and thereafter reacting the intermediate reaction product with a silane containing hydrogen in the presence of a platinum catalyst. Where it is desired to produce monomers containing an ester linkage, the monoetherified polyethyleneoxy glycol is esterified with acryloyl chloride and then a hydrogen containing silane and platinum catalyst is added to the resultant intermediate.

In preparing the hydrophilic monomers described above, one essential ingredient is terminally unsaturated polyethers which are not readily available in commercial quantities. These terminally unsaturated polyethers may be prepared by reacting monoetherified polyalkyleneoxy glycols with allyl chloride. Furthermore, the silicon compounds described by Pittman et al, contain an ester group, whereas the silylated polyethers of the present invention contain diester linkages.

Therefore, one of the advantages of this invention is that the silylated polyethers of this invention use materials which are readily available such as polyoxyalkylene glycols and haloalkylalkoxysilanes. Another advantage of the silylated polyethers of this invention is that these silylated polyethers will crosslink to form hydrophilic coatings on textile materials treated therewith. The hydrophilic property improves the comfort of textile materials by wicking away body perspiration. Furthermore, the silylated polyethers of this invention impart softness to textile materials treated therewith which offset the harsh hard imparted to textile materials treated with aminoplast resins. Also, it has been found that the silylated polyethers of this invention will extend the aminoplast resins and in certain applications may replace the aminoplast resins.

Therefore, it is an object of this invention to provide silylated polyethers. Another object of this invention is to provide silylated polyethers which may be applied to textile materials to impart a soft silkyl hand and resistance to soil redeposition. Still another object of this invention is to provide silylated polyethers which may be applied to textile materials to impart hydrophilic properties thereto. A further object of this invention is to provide silylated polyethers which are water soluble and will not separate before and/or during application to textile materials. A still further object of this invention is to provide a single component, water soluble, stable silicon containing composition for treating textile materials.

SUMMARY OF INVENTION

The foregoing objects and others which will become apparent from the following description are accomplished in accordance with this invention, generally speaking, by providing silylated polyethers having the general formula $$\left[ \begin{array}{l} CH_2(OC_nH_{2n})_xR\ A_b \\ CH\ (OC_nH_{2n})_xR\ A_c \\ CH_2(OC_nH_{2n})_xR\ A_d \end{array} \right]_a$$

wherein at least one R is selected from the group consisting of

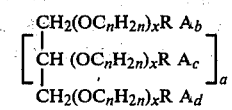

in which the radicals are linked to the polyether through an ester and the remaining R groups are selected from hydrocarbonoxy radicals having up to 18 carbon atoms, hydroxyl radicals or a radical of the formula

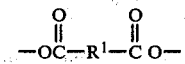

$R^1$ is a divalent hydrocarbon radical selected from the group consisting of $-(CH_2)_y$, $-CH=CH-$, or a cyclic radical selected from the group consisting of $C_6H_4$, $C_6H_8$ and $C_{10}H_6$; A is a silicon containing radical selected from the group consisting of cationic or anionic radicals of the formula

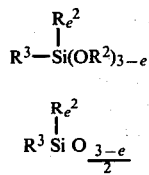

wherein $R^2$ which may be the same or different, is a monovalent hydrocarbon radical having from 1 to 18 carbon atoms, $R^3$ is a divalent hydrocarbon radical having from 1 to 18 carbon atoms, a is a number of from 0 to 4, b, c and d are each numbers of from 0 to 1, the sum of b, c and d must be at least 1, and when b, c or d are 0, then R must be a hydroxyl or hydrocarbonoxy radical or a radical of the formula

e is a number of from 0 to 2, n is 2, 3 or 4, x is a number of at least 1 and up to 600, preferably from 10 to 250 and y is a number of from 0 to 8. These silylated polyethers may be applied to textile materials to form a hydrophilic coating thereon.

DETAILED DESCRIPTION

The silylated polyethers of this invention may be prepared by reacting an oxyalkylene glycol or copolymers thereof with a dicarboxylic acid or a cyclic anhydride thereof at a temperature of from about 80° to 185° C. and thereafter reacting the resultant carboxylic acid polymer with a haloalkylalkoxysilane at a temperature of from 50° to 185° C. An acid acceptor, e.g., triethylamine may be used, if desired.

The oxyalkylene glycols and copolymers thereof which are used to make the compositions of this invention are well known in the art. These glycol polymers and copolymers may be illustrated by the following formula:

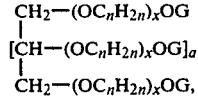

where G is hydrogen or an alkyl radical having from 1 to 18 carbon atoms, in which at least one G must be hydrogen and a is defined above, n is 2, 3 or 4, x is a number of at least 1 and up to 600, preferably from 10 to 250. Generally, these polymers are made by the homopolymerization or copolymerization of ethylene oxide and propylene oxide using various alcohols as intiators. Examples of alcohols are glycerine, methanol, ethylene glycol, ethanol, t-butanol and the like.

Suitable examples of cyclic anhydrides that may be used to make the compositions of this invention are succinic anhydride, glutaconic anhydride, maleic anhydride, 1,2-cyclohexanedicarboxylic anhydride, 1-cyclohexene-1,2-dicarboxylic anhydride, 3-cyclohexene-1,2-dicarboxylic anhydride, 4-cyclohexene-1,2-dicarboxylic anhydride, 1,8-naphthalic acid anhydride and phthalic anhydride.

When dicarboxylic acids are used, it may be advantageous to employ an esterification catalyst such as titanates, alkali metal hydroxides and mineral acids.

Suitable examples of dicarboxylic acids having up to 10 carbon atoms which may be used are oxalic acid, malonic acid, succinic acid, glutaric acid, adipic acid, pimelic acid, suberic acid, azelaic acid and sebacic acid.

The haloalkylalkoxysilanes which may be used in the preparation of the silylated polyethers may be represented by the formula

wherein $R^2$ and $R^3$ and e are the same as above, and X is a halogen such as chlorine, bromine and iodine.

More specifically, suitable examples of haloalkylalkoxysilanes that may be used are chloropropyltrimethoxysilane, chloropropylmethyldimethoxysilane, chloropropyldimethylethoxysilane, bromobutylethyldimethoxysilane and the like.

In the above reactions, the mole ratio of cyclic anhydride or dicarboxylic acid to hydroxyl groups linked to the polyether may be varied over a wide range. For example, the mole ratio of cyclic anhydride or dicarboxylic acid to hydroxyl group may range from 0.17:1 to 1.25:1 with the preferred ratio of cyclic anhydride or dicarboxylic acid to hydroxyl groups being from 0.33:1 to 1.1:1, with the proviso that at least one hydroxyl group per molecule is reacted with the cyclic anhydride or dicarboxylic acid.

In the subsequent silylation of the polyethers, the mole ratio of the carboxylic acid radical formed from the reaction of the cyclic anhydride with the above to the haloalkyl radicals linked to the silane may range from 0.17:1 to 1.25:1.

Suitable examples of silicon containing radicals represented by A are

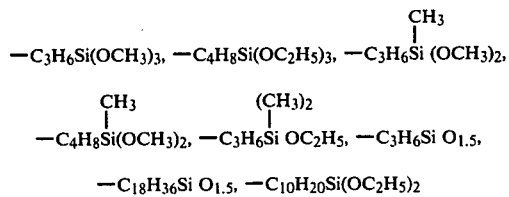

The unsatisfied valences of the silicon atoms in the above formulas are satisfied by silicon-oxygen-silicon linkages.

Suitable examples of hydrocarbonoxy radicals represented by R having from 1 to 18 carbon atoms are methoxy, ethoxy, propoxy, butoxy, octoxy, dodecoxy and octadecoxy radicals. Examples of suitable divalent hydrocarbon radicals represented by $R^1$ which have from 1 to 10 carbon atoms are methylene, ethylene, trimethylene, tetramethylene, pentamethylene, hexamethylene, octamethylene and decamethylene radicals. Examples of divalent aryl radicals represented by $R^1$ are phenylene, naphthenylene and cyclohexenylene radicals.

Suitable examples of monovalent hydrocarbon radicals represented by $R^2$ are alkyl radicals, e.g., methyl, ethyl, propyl, butyl, hexyl, octyl, decyl, dodecyl and octadecyl radicals; aryl radicals, e.g., the phenyl radical; alkaryl radicals, e.g., tolyl, xylyl and ethylphenyl radicals, cycloalkyl radicals, e.g., cyclobutyl, cyclohexyl, cyclodecyl radicals; aralkyl radicals, e.g., benzyl, 2-phenylethyl, 2-phenylpropyl.

Suitable examples of divalent hydrocarbon radicals represented by $R^3$ are ethylene, trimethylene, tetramethylene, hexamethylene, octamethylene, dodecamethylene, hexadecamethylene and octadecamethylene radicals.

The silylated polyethers of this invention can be applied to textile materials in admixture with other substances which have heretofore been used to impart certain properties to textile materials. Other substances which may be used in combination with the silylated polyethers are lubricating agents, agents which impart abrasion resistance to the treated fibers, materials which improve the fragrance of the treated materials, antistatic lubricants, fabric softeners, fire retardants, soil resistant materials and crease-proofing agents. Examples of crease-proofing agents are aminoplast resins such as urea-formaldehyde resins, melamine-formaldehyde resins, and dimethylol dihydroxy ethylene urea which may contain magnesium chloride and zinc nitrate as catalysts. Other crease-proofing resins are phenol-formaldehyde and hydroxyethyl methacrylate resins.

The silylated polyethers of this invention may be applied in concentrated form or as an aqueous solution or as an aqueous dispersion, or dissolved in organic solvents such as di-n-butylether, aromatic hydrocarbons, and/or chlorinated hydrocarbons.

These silylated polyethers possess a variety of outstanding properties. By way of illustration they can be prepared so that they are soluble in water. Also, they can be prepared so that they are water insoluble, but are easily emulsified or dispersed in water without the aid of an emulsifying or dispersing agent.

The amount of silylated polyethers dissolved or dispersed in water may vary over a wide range. Generally, the amount of silylated polyether present in an aqueous solution or dispersion may range from about 0.25 to 99 percent, preferably from about 1 to 60 percent and more preferably from about 2 to 50 percent by weight based on the weight of the silylated polyether and solvent.

The silylated polyethers of this invention, and if desired other substances, may be applied to all textile materials, preferably organic textile materials on which organopolysiloxanes have been or could have been applied heretofore. Examples of such textile materials are wool, cotton, rayon, hemp, natural silk, polypropylene, polyethylene, polyester, polyurethane, polyamide, cellulose acetate, polyacrylonitrile fibers, and mixtures of such fibers. The textile materials may consist of staple fibers or monofilaments.

The silylated polyethers of this invention and other substances, if desired, may be applied to the textile materials by any means known in the art, such as by spraying, immersion, coating, foaming, calendering or by gliding the fibers across a base which has been saturated with the silylated polyethers of this invention and other materials, if desired.

Generally, the solids add-on is in the range of from 0.025 to 20 percent and preferably from about 0.05 to 10 percent, based on the weight of the original textile material.

After the textile material has been treated, it is dried at an elevated temperature, e.g., from about 50° to 200° C. for a brief period of time, e.g., from about 3 to 15 minutes.

The treated textile material should contain from about 0.025 to about 10 percent by weight on a dry basis of the cured composition of this invention.

Textile materials treated with the silylated polyethers of this invention possess all of the properties common to prior art textile materials, such as soft hand, with the additional property of being hydrophilic and soil resistant.

Specific embodiments of this invention are further illustrated in the following examples in which all parts are by weight unless otherwise specified.

EXAMPLE 1

(a) A mixture containing about 106.1 parts of succinic anhydride and 2000 parts of oxyethylene-oxypropylene triol copolymer, having a molecular weight of 6360 and a weight ratio of oxyethylene to oxypropylene of 7 to 3 is heated at 175° C. for eighteen hours in a reaction vessel. The resultant product is a yellow liquid having a viscosity of 4,168 cs. at 25° C. and an acid content of 0.58 milliequivalent per gram (theoretical 0.5).

(b) About 258.6 parts of the above product are mixed with 29.8 parts of chloropropyltrimethoxysilane, 15.2 parts of triethylamine and 100 parts of toluene and refluxed for nine hours. A white solid by-product is removed by filtration which is identified as triethylamine hydrochloride.

The volatiles are then vacuum stripped off, yielding a brown liquid having a viscosity of 29,347 cs. at 25° C. A portion of the resultant product is dissolved in water and the water evaporated off in an oven at 172° C. A friable-rubber film is formed which shows that a silylated product is obtained.

EXAMPLE 2

(a) A mixture containing about 106.1 parts of succinic acid and 2000 parts of oxyethylene-oxypropylene triol copolymer, having a molecular weight of 6360 and a weight ratio of oxyethylene to oxypropylene of 7 to 3, 0.1 part of sulfuric acid and 500 parts of xylene are heated to reflux and the water by-product is collected in a Dean Stark head. The xylene is removed under vacuum (1 torr.) at a temperature up to about 150° C. The resultant carboxylic acid functional polyether is a yellow liquid having an acid content of about 0.59 milliequivalent per gram (theoretical 0.5).

About 258.6 parts of the product prepared in (a) above are mixed with 29.8 parts of chloropropyltrimethoxysilane, 15.2 parts of triethylamine and 100 parts of toluene and refluxed for nine hours. A liquid product containing a white solid precipitate is filtered. The white solid precipitate is identified as triethylamine hydrochloride.

The volatiles are then removed under vacuum (1 torr.), yielding a product similar to the silylated polyether formed in Example 1.

EXAMPLE 3

The procedure of Example 1 is repeated except 155 parts of phthalic anhydride is substituted for the succinic anhydride. A portion of the resultant product is dissolved in water and the water evaporated off in an oven at 172° C. A friable-rubber film is formed.

EXAMPLE 4

The procedure of Example 1 is repeated except 105 parts of maleic anhydride is substituted for the succinic anhydride. A portion of the resultant product is dissolved in water and the water evaporated off in an oven at 172° C. A friable-rubber film is obtained.

COMPARISON EXAMPLE V₁

About 258.6 parts of oxyethylene-oxypropylene triol copolymer, having a molecular weight of 6360 and a weight ratio of oxyethylene to oxypropylene of 7 to 3 are mixed with 29.8 parts of chloropropyltrimethoxysilane for one hour at room temperature. The resultant mixture is combined with water and then the water is evaporated off in an oven at 172° C. A liquid film is formed which shows the absence of crosslinking.

EXAMPLE 5

A textile fabric containing a mixture of Dacron and cotton (65/35) is treated with the silylated polyethers of this invention by dipping the fabric in aqueous solutions containing 0.7 percent by weight of the various compositions prepared in the Examples and 1.7 percent by weight of dimethyol dihydroxy ethylene urea in which the percent by weight is based on the total weight of the solution. The fabric is then dried for two minutes at 170° C. in a forced air oven. The hydrophilic properties of the fabric are evaluated in accordance with the procedure described in the AATCC Test Method 39-1977 "Wettability: Evaluation of." Each fabric is then laundered and the properties reevaluated. Table I shows the results of these tests.

COMPARISON EXAMPLE V₂

A textile fabric containing a mixture of Dacron-cotton (65/35) is treated with an aqueous solution containing 1.7 percent of dimethyol dihydroxy ethylene urea in accordance with the procedure described in Example 5. The treated fabric has a harsh stiff hand. The results of the tests are shown in the following Table.

TABLE I

| Example No. | Wetting time, (sec.) | | | | | |
|---|---|---|---|---|---|---|
| | Initial | 1 Wash | 2 Washes | 3 Washes | 4 Washes | 5 Washes |
| 1 | 5 | 6 | 8 | 8 | 10 | 11 |
| 2 | 4 | 7 | 8 | 8 | 11 | 12 |
| 3 | 7 | 8 | 11 | 12 | 12 | 13 |
| 4 | | 13 | 8 | 9 | 12 | 13 |
| Comparison Example V₂ | | 10 | 11 | — | — | — |

EXAMPLE 6

The procedure of Example 5 is repeated except that a Dacron fabric is treated with aqueous solutions containing 5 percent by weight based on the weight of the aqueous solutions of the compositions described in the Examples. The dimethylol dihydroxy ethylene urea is omitted from the aqueous solutions. The following table shows the results of these tests.

| Example No. | Initial Wetting Time | Wetting Time After 1 Wash |
|---|---|---|
| None | 10 min. | 10 min. |
| 1 | 3 sec. | 20 sec. |
| 2 | 4 sec. | 22 sec. |
| 3 | 5 sec. | 30 sec. |
| 4 | 4 sec. | 25 sec. |

The above table shows that each of the compositions impart hydrophilic properties to the treated fabric and after one wash have a soft, silky hand.

EXAMPLE 7

Fabrics, including cotton, wool, nylon, and rayon are treated with the composition of Example 1 in accordance with the procedure described in Example 5. The treated fabrics exhibit hydrophilic properties and have a soft, silky hand.

What is claimed is:

1. Silylated polyethers of the general formula

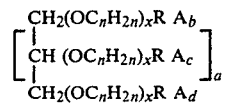

in which at least one R is a radical of the formula

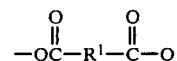

in which the radical is linked to the polyether through an ester linkage and the remaining R groups are selected from the group consisting of hydroxyl, hydrocarbonoxy radicals having up to 18 carbon atoms and a radical of the formula

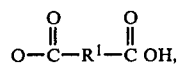

$R^1$ is a divalent hydrocarbon radical selected from the group consisting of $(-CH_2)_y$, $-CH=CH-$ and a cyclic radical selected from the group consisting of $C_6H_4$, $C_6H_8$, $C_6H_{10}$ and $C_{10}H_6$; A is a silicon containing radical selected from the formulas

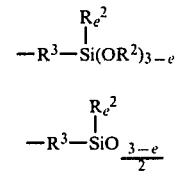

in which $R^2$ is a monovalent hydrocarbon radical having from 1 to 18 carbon atoms, $R^3$ is a divalent hydrocarbon radical having from 1 to 18 carbon atoms, a is a number of from 0 to 4, b, c and d are each numbers of from 0 to 1 and the sum of b, c and d must be at least 1 and when b, c or d are 0, then R is selected from the group consisting of a hydroxyl, a hydrocarbonoxy radical and a radical of the formula

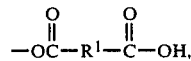

e is a number of from 0 to 2, n is 2, 3 or 4, x is a number of at least 1 and up to 600 and y is a number of from 0 to 8.

2. The silylated polyethers of claim 1, wherein A is a radical of the formula

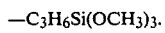

3. A silylated polyether of the formula

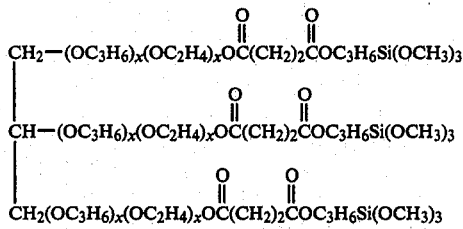

in which x is a number of from 1 to 600.

4. A process for preparing the silylated polyethers of claim 1 which comprises reacting an oxyalkylene glycol with a compound selected from the group consisting of a dicarboxylic acid and a cyclic anhydride thereof at a temperature of from 80° to 185° C. and thereafter reacting the resultant product with a haloalkylalkoxysilane having from 1 to 3 alkoxy groups linked to the silicon atom at a temperature of from 50° to 185° C.

5. The process of claim 4, wherein the oxyalkylene glycols are represented by the formula

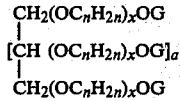

where G is a hydrogen or an alkyl group having from 1 to 18 carbon atoms in which at least one G must be hydrogen, a is a number of from 0 to 4, n is 2, 3 or 4 and x is a number of from 1 to 600.

6. The process of claim 4, wherein the haloalkylalkoxysilane is a chloropropyltrimethoxysilane.

7. A process for treating a textile material which comprises coating a textile material with a composition containing the silylated polyether of claim 1 and thereafter curing the coated material at a temperature of from 50° to 200° C.

8. The process of claim 4, wherein the silylated polyether of claim 1 is mixed with a diluent prior to coating the textile material.

9. The process of claim 8, wherein the diluent is a solvent for the silylated polyether.

10. The process of claim 9, wherein the solution contains from 0.25 to 99 percent by weight of silylated polyether based on the weight of silylated polyether and solvent.

11. The process of claim 8, wherein the diluent is water.

12. The process of claim 7, wherein the textile material is a polyester.

13. The process of claim 7, wherein the textile material is a blend of polyester and cotton.

14. The process of claim 7, wherein the textile material is cellulose.

15. The coated textile material of claim 12.

16. The coated textile material of claim 12, which contains from 0.025 to 10 percent by weight of the cured composition.

17. The coated textile material of claim 13.

18. The coated textile material of claim 14.

* * * * *